United States Patent [19]

Corral Martinez

[11] 4,195,719

[45] Apr. 1, 1980

[54] CONSTRUCTION OF FRICTION CLUTCHES

[75] Inventor: Cecilio Corral Martinez, Murcia, Spain

[73] Assignee: Francisco Montoro Munoz, Madrid, Spain

[21] Appl. No.: 845,805

[22] Filed: Oct. 27, 1977

[30] Foreign Application Priority Data

Jul. 19, 1977 [ES] Spain .................. 460.871

[51] Int. Cl.² .............................. F16D 13/50
[52] U.S. Cl. .................... 192/89 B; 192/70.27
[58] Field of Search ............. 192/89 B, 70.27, 70.29, 192/70.3

[56] References Cited

U.S. PATENT DOCUMENTS

| 3,385,409 | 5/1968 | Smirl | 192/89 B |
| 3,811,544 | 5/1974 | Maucher | 192/70.27 |
| 4,069,905 | 1/1978 | deGennes | 192/89 B |

FOREIGN PATENT DOCUMENTS

| 1940681 | 2/1971 | Fed. Rep. of Germany | 192/89 B |
| 2116423 | 10/1972 | Fed. Rep. of Germany | 192/70.27 |
| 2305638 | 10/1976 | France | 192/89 B |

*Primary Examiner*—Benjamin Wyche
*Assistant Examiner*—David C. Reichard
*Attorney, Agent, or Firm*—Robert L. Lindgren; Lloyd L. Zickert; Joseph A. Yanny

[57] ABSTRACT

The fastening of a diaphragm spring to the casing of a clutch is effected by means of a annular piece that acts elastically on the diaphragm independently of the riveting, offering a high degree of resistance to flexion between rivets, which piece is of a hollow and incomplete toroidal shape in a support zone on the diaphragm, which zone presents an angular extension of more than 180°, permitting an elastic deformation or a reduction of its height of assembly without exceeding the elastic limit of the material that originates the elastic force necessary for the perfect operation of the device and at the same time absorbing the dimensional differences due to the necessary and admissible tolerances of manufacture, with the special feature that the interior part of the said piece is provided with a flange for increasing the moment of inertia of the section of the piece, increasing resistance to flexion between two consecutive orifices of the said piece.

2 Claims, 13 Drawing Figures

CONSTRUCTION OF FRICTION CLUTCHES

This invention refers to improvements in the construction of friction clutches, the purpose of which is that of providing to the market and to the public in general a markedly improved clutch and with numerous advantages with respect to those for similar purposes that exist up to the present time.

The said improvements which are the subject of the invention, have been made in the friction clutches that are used for the progressive transmission of torque from a primary producer apparatus (engine) to one or more receptor apparatuses which utilize the energy supplied by the first.

At present various types of friction clutches exist although this invention is specifically concerned with clutches constituted basically by the following elements:

A flywheel which is a piece solidly joined to the crankshaft or driving shaft and constituted by a disc of suitable dimensions, the rotation of which is effected by the said crankshaft or driving shaft.

A casing which is a metal box or housing and is fixed to the flywheel by means of a screw or other fastening elements in such a way that both (the flywheel and the casing) rotate together.

A pressure plate which is constituted by a ring which, by means of pressing against the flywheel can grip a disc coaxial to the driving shaft, the said ring or pressure plate being preferably made of cast iron.

A shaft on which there is keyed a coaxial disc, which shaft receives the total or partial engine torque in accordance with the force that the pressure plate exerts on the flywheel, gripping the coaxial disc referred to between the two.

A diaphragm constituted by a spring in the form of a domed washer in such a way that the force exerted on the pressure plate proceeds from the said spring which is appropriately placed between the pressure plate and the casing.

However, taking into account the above-mentioned parts or principal elements mentioned, of which the clutch is constituted, these present the disadvantage that the fastening of the diaphragm to the casing constitutes a problem not yet resolved in a completely satisfactory way, so that many solutions have been attempted by all the manufacturers without attaining an ideal solution. In some cases the diaphragm is fastened to the casing by means of two steel wire rings joined to the casing by means of various rivets, which rings constitute the fulcrum or tilting point of the diaphragm. In other cases, one of the rings mentioned has been substituted by an annular impression made in the casing by stamping, at the expense of the thickness of the plate.

Both solutions present the disadvantage of lack of rigidity of the rings, offering hardly any resistance to flexion on the stretches between two consecutive rivets. The said lack of rigidity causes the diaphragm not to be supported in a uniform manner on the circle represented by the ring, but only on the points constituted by the rivets.

This deficient support causes displacements of the rings to be produced during functioning and in some cases the escape from its place or the dismantling of the ring with the consequent premature rupture of the diaphragm.

Likewise attempts have been made to provide other solutions to such disadvantages in such a way that in all cases the initial pressure of the assembly will be lost as the device begins to function, since really no elastic element exists that is capable of a supplying pressure necessary for a constant force.

The invention which is the subject of this Patent Application substitutes one of the rings by a piece with a form designed in order to act elastically on the diaphragm independently of the initial pressure of the riveting, offering in addition a high degree of resistance to flexion between rivets.

In order to complement the description that will be given in what follows and with the purpose of aiding a greater understanding of the characteristics of the invention, a set of drawings is attached to this descriptive memorandum, the figures of which represent the following:

Figure 1:
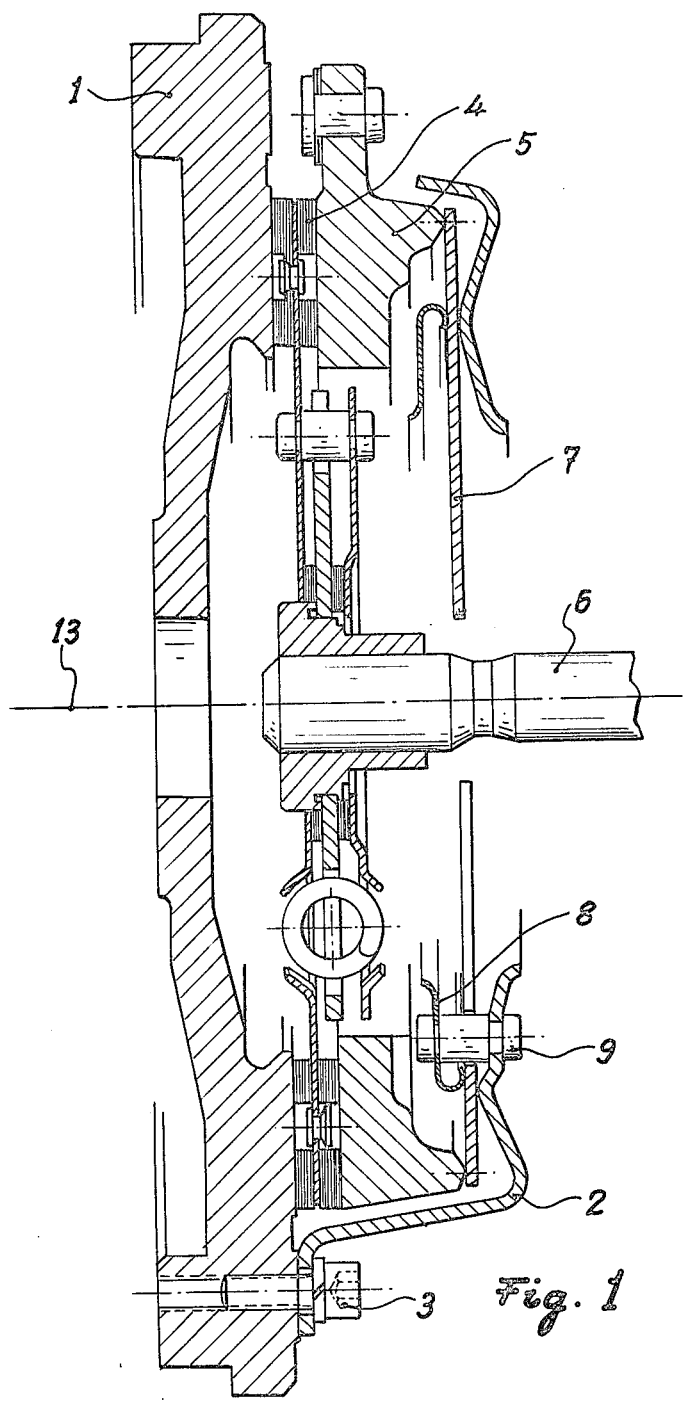
FIG. 1 shows a lateral elevation and sectioned view of the friction clutch.
Figure 2:
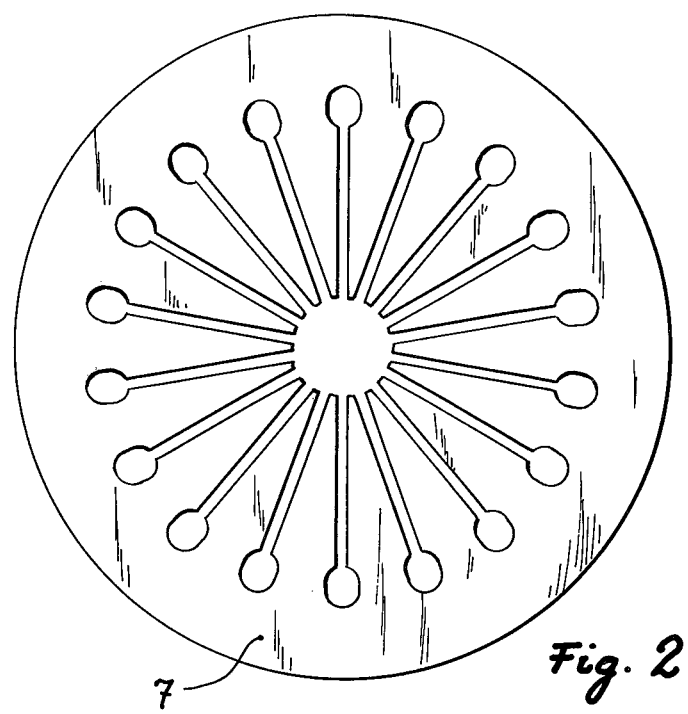
FIG. 2 shows a plan view of the domed washer that constitutes and is denominated the diaphragm.

In the above-mentioned Figures the principal parts or elements that constitute the assembly or principal basis of a friction clutch have been referenced numerically, such references corresponding in the following way:

1. Flywheel
2. Casing
3. Screws
4. Coaxial disc
5. Pressure plate
6. Primary shaft
7. Diaphragm
8. Special piece
9. Separator rivet
10. Rivets
11. Wire ring
12. Wire ring
13. Driving shaft
14, 16 and 17. Parts of a conventional clutch
15. Circular impression
18. Flange of the piece (8)
19. Orifices of the piece (8)
20. Lightening apertures of the piece (8)

In the above-mentioned figures the principal elements may be seen which constitute a friction clutch, among which elements the following are of special note: the flywheel (1); the casing (2) fixed to the flywheel by means of the screws (3) or other conventional fastening elements, so that both (casing and flywheel) rotate together; the pressure plate (5); a coaxial disc (4); the primary shaft (6) and the diaphragm (7).

The flywheel (1) is solidly joined to the crankshaft or driving shaft (13) rotating with the latter, and being constituted by a disc of appropriate dimensions, while the coaxial disc (4) is coaxial with respect to the primary shaft (6) and which may be gripped against the flywheel (1) by the pressure plate (5) which will preferaby be made of cast iron.

The force exerted by the said pressure plate (5) proceeds from the diaphragm (7) which is constituted by a spring in the form of a domed washer placed appropriately between the said pressure plate (5) and the casing (2).

The fastening of the diaphragm (7) to the casing (2) is a problem that has not yet been resolved satisfactorily, so that in FIGS. 3, 4, 5, 6 and 7 the solutions adopted by various manufacturers of clutches are shown.

The great variety of solutions is due to the fact that all of them present considerable disadvantages.

Figure 3:
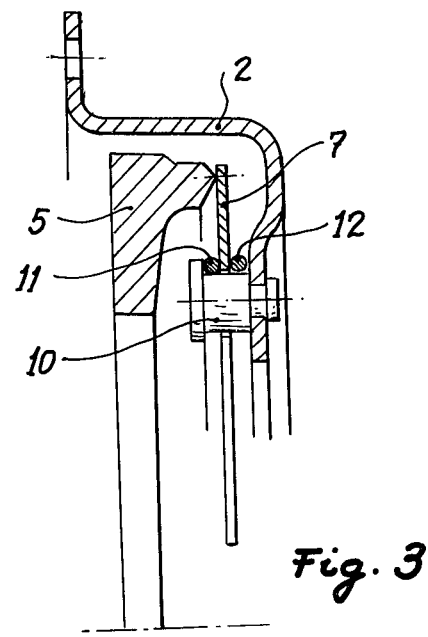
FIG. 3 shows a sectioned detail of the form of fastening the diaphragm to the casing in accordance with a conventional form of embodiment.

In FIG. 3 the diaphragm (7) is fastened to the casing (2) by means of two steel wire rings (11) and (12) joined to the casing by means of various rivets (10).

The two wire rings (11) and (12) constitute the fulcrum or tilting point of the diaphragm (7).

Figure 4:
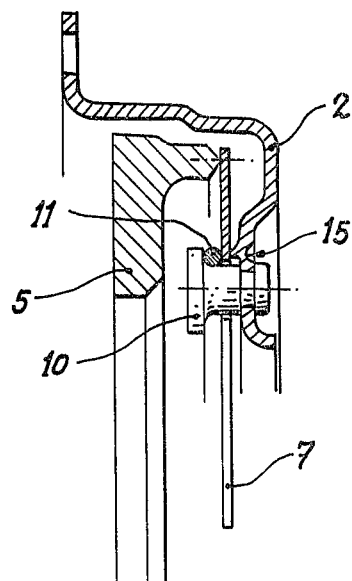
FIG. 4 shows a variant of embodiment of the detail represented in the preceding figure.

FIG. 4 represents a variant of the arrangement of FIG. 3, consisting in replacing the ring (12) by a circular impression formed in the casing by stamping, at the expense of the thickness of the plate.

Figures 7, 8, 9:
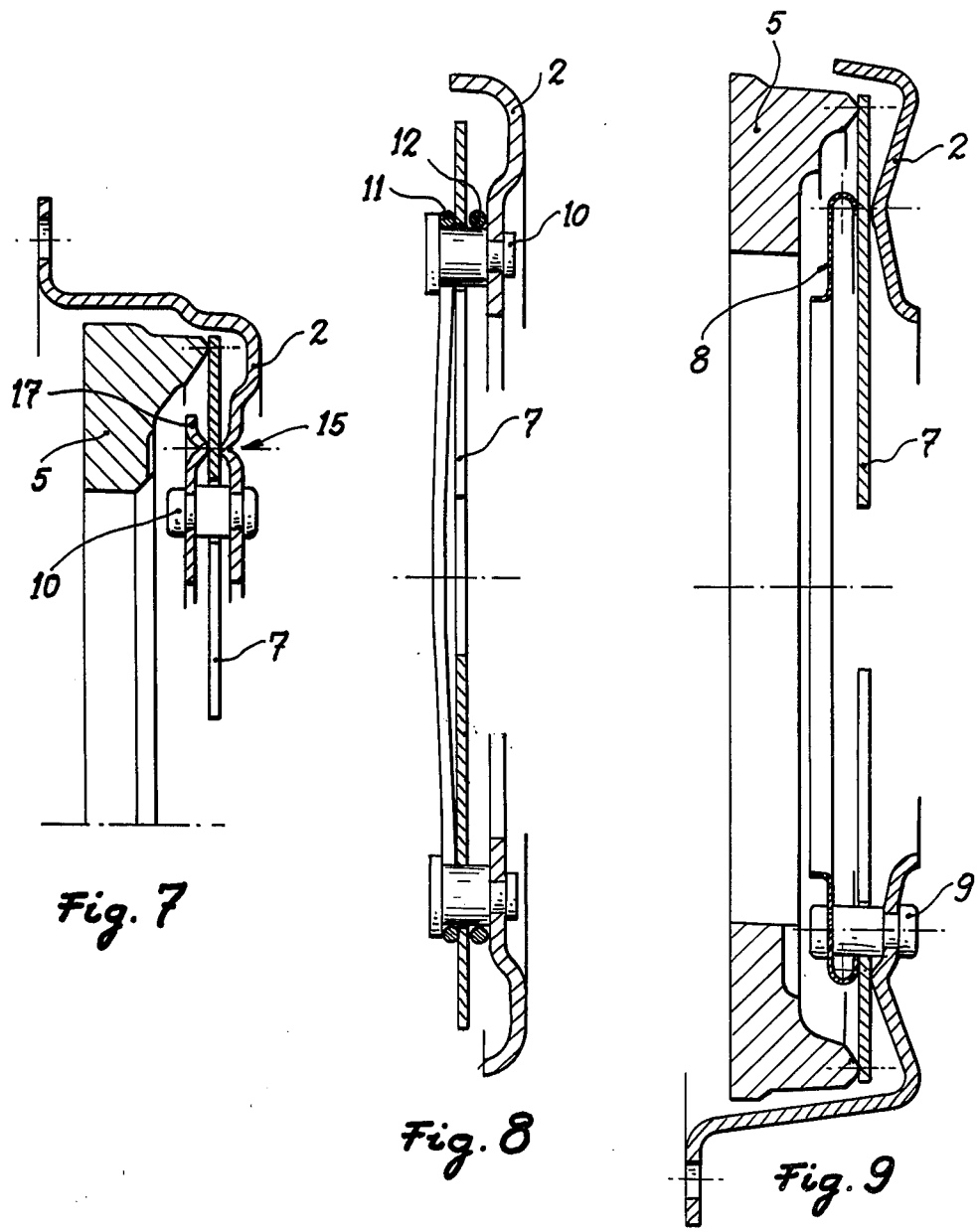
FIG. 8 shows another sectioned detail in which it is seen that the diaphragm is not supported on a ring for lack of resistance of the latter.
FIG. 9 shows a detail in which there may be seen the specially designed piece made in accordance with the invention, which piece corrects all the disadvantages presented by the conventional embodiments represented in FIGS. 1 to 8.

Both solutions offer the disadvantage of lack of rigidity of the rings (11) and (12), especially of (11) which is only supported on the head of the rivets (10), offering hardly any resistance to the flexion of the stretches between two consecutive rivets. FIG. 8 aids in the understanding of what has just been said.

This lack of rigidity causes the diaphragm (7) not to be supported in a uniform manner on the circle represented by the ring (11) but only on the points constituted by the rivets (10).

This deficient support causes displacements of the ring to be produced during functioning and in some cases the escape from its place or the dismantling of the ring (11) and the consequent premature rupture of the diaphragm (7).

Figure 6:
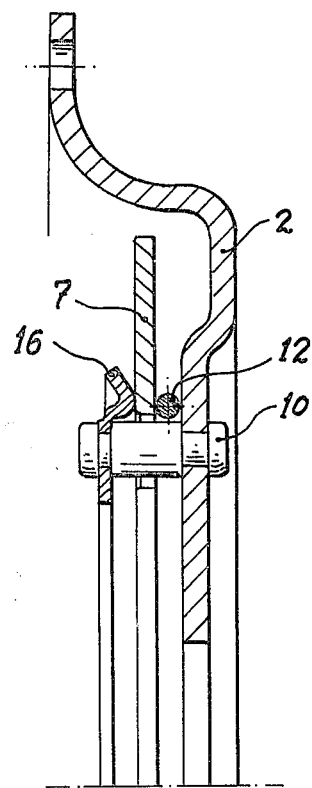
FIGS. 5, 6 and 7 show other forms of conventional embodiment in which it is endeavoured to correct the lack of rigidity of the fastening which is represented in FIGS. 3 and 4.
Figure 5:
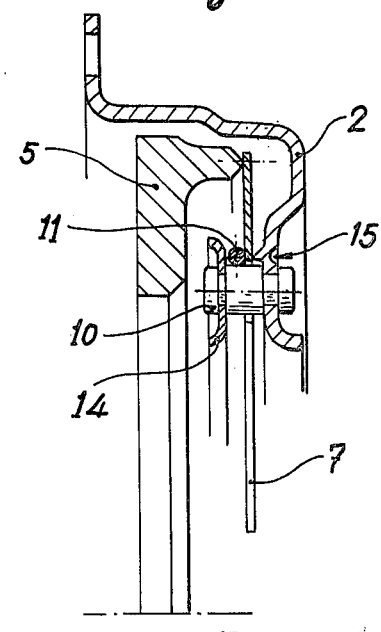

The devices shown in FIGS. 5, 6 and 7 endeavour to correct the lack of rigidity of the said fastening. In FIG. 5 the wire ring (12) is supported wholly or partly on a crown of drawn sheet steel (14).

In FIGS. 6 and 7 the crowns (16) and (17) respectively replace the wire ring (11).

Manufacture is technologically difficult to carry out with the arrangement of FIGS. 5, 6 and 7. In order that the assembly may function satisfactorily it is necessary that the diaphragm (7) pivots adequately on its fulcrum, for which it is necessary that the pressure with which the diaphragm is fastened to the casing be maintained within predetermined values.

On observing FIGS. 3, 4, 5, 6 and 7 it may be clearly seen that the previously mentioned pressure proceeds solely from the separator rivet (10).

It is also easy to understand that the initial pressure of the assembly becomes lost as the device begins to function, since there really does not exist any elastic element capable of supplying the necessary pressure in a constant form.

This invention completely corrects the fundamental defect explained in the preceding paragraph and all those other defects inherent in the arrangements that are being employed at the present time, in the way that will be explained in what follows:

FIG. 9 will aid in the understanding of the explanation that follows:

The invention consists basically in replacing the wire ring (11) and or the pieces (14), (16) and (17) of FIGS. 3, 4, 5, 6 and 7 by the piece (8) of FIG. 9.

This piece (8) has a shape designed in order to act elastically on the diaphragm (7) independently of the initial pressure of the riveting and in addition to offer a high degree of resistance to flexion between rivets.

The material to be employed in its manufacture will normally be low carbon steel sheet for drawing, in necessary cases spring steel will be used, or drawing steel will be thermically treated to improve its limits of elasticity.

Figure 10:
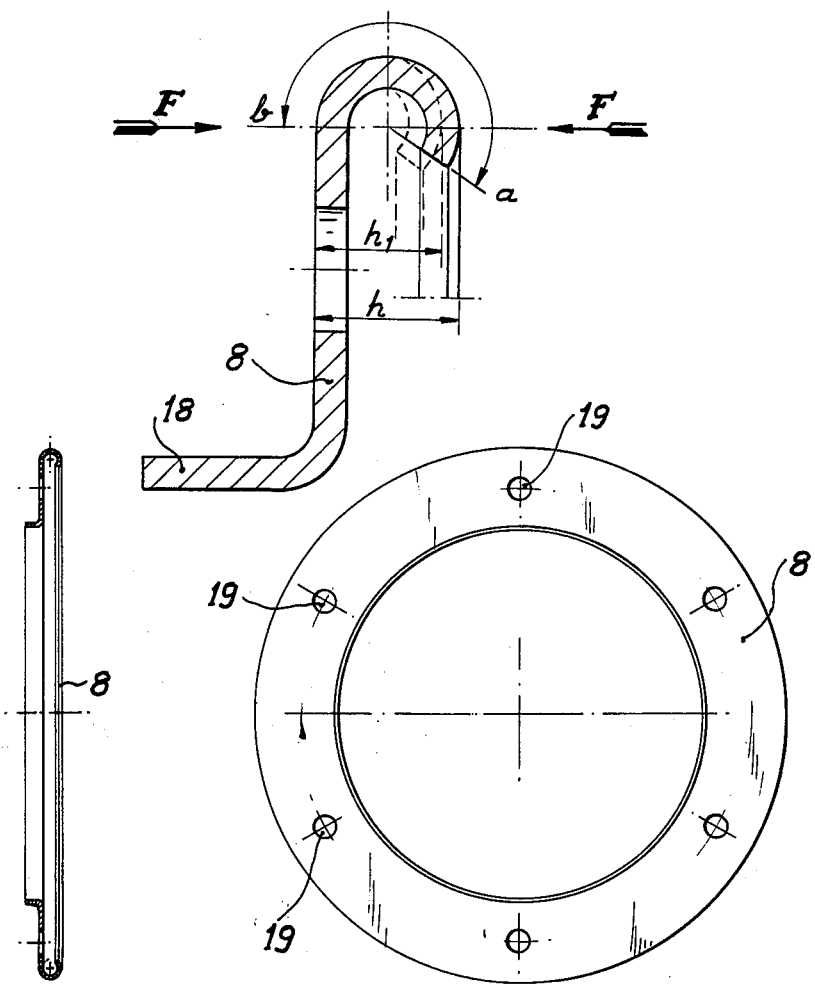
FIG. 10 shows the shape of the piece mentioned in FIG. 9 in accordance with a plan, a lateral and a sectioned view.

The characteristics of the shape of the piece (8) basic to this invention are the following:

1. The part that rests on the diaphragm (7) has a hollow and incomplete toroidal shape, as may be seen in FIG. 10, zone from a to b, whose angular extension is greater than 180°, that is to say it exceeds the diameter FF towards a, permitting an elastic deformation in the direction of FF, that is to say a prior reduction of the height h in the assembly without exceeding the elastic limit of the material that originates the elastic force necessary for the perfect functioning of the device and in order to absorb the dimensional differences due to the necessary and admissible tolerances of the manufacture. (h is the free height, and $h_1$ is the height of the assembly).

2. The lower part of the piece is formed by the flange (18), FIG. 10, the purpose of which is to increase the moment of inertia of the section of the piece, thus increasing the resistance to flexion between two consecutive apertures of the piece (8).

3. The piece (8) is provided with a series of orifices (19) that permit it to be joined to the casing (2) by means of the separator rivets (9) of FIG. 9.

Figure 11:
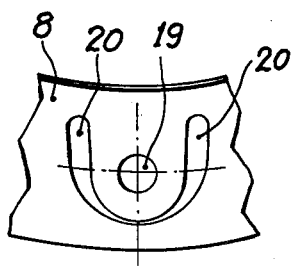
FIGS. 11, 12 and 13 show other variants of the piece mentioned in FIG. 9.
Figure 12:
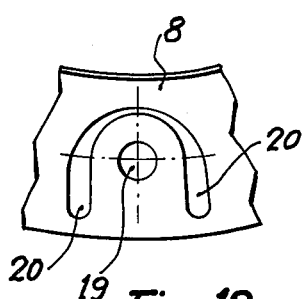
Figure 13:
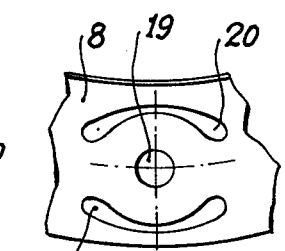

4. As a variant the piece (8) may have a number of perforations (20) for lightening the material surrounding each and every one of the orifices (19) the purpose of which is to increase the axial elasticity of the said piece as explained in FIGS. 11, 12 and 13.

What is claimed is:

1. An improved friction clutch of the type that includes:
   a flywheel solidly joined to a crankshaft so as to rotate therewith;
   a casing fixed to the flywheel;
   a disc coaxially keyed to a mainshaft;
   pressure plate means for moving said disc into disengageable contact with said flywheel;
   diaphragm means for biasing said pressure plate means towards said flywheel in a first position wherein said diaphragm means is:
   (a) located between said pressure plate means and said casing;
   (b) in contact with said pressure plate means; and
   (c) fastened to said casing;
   first riveting means for fastening said diaphragm means to said casing, comprising a plurality of rivet members having a portion thereof projecting inwardly toward said pressure plate;

wherein said improvement comprises:

a second means for fastening said diaphragm means to said casing including:
  (a) an annular piece located between said diaphragm means and said pressure plate means, including orifice means for receiving said rivet members; and
  (b) a portion of said annular piece comprising an elastic hollow and incomplete toroidel fold means for elastically supporting said diaphragm means independently of said first riveting means wherein said fold means subtends an angle of more than 180°, contacts with said diaphragm means and is composed of an elastically deformable material providing means for reversibly reducing a height of said fold means; and wherein said annular piece further includes means for resisting flexion between consecutive orifice means comprising flange means for providing a high moment of inertia generally near an inner circumference of said annular piece.

2. The apparatus of claim 1 wherein said annular piece includes aperture means for providing said annular piece with decreased stiffness, wherein said orifice means are located generally near an outer circumference of said annular piece and may receive said rivet members; and said aperture means are generally near said orifice means.

* * * * *